(12) United States Patent
De Jong

(10) Patent No.: US 9,614,764 B2
(45) Date of Patent: Apr. 4, 2017

(54) SYSTEM COMPRISING NODES WITH ACTIVE AND PASSIVE PORTS

(75) Inventor: Roelof P. De Jong, Eindhoven (NL)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

(21) Appl. No.: 12/446,636

(22) PCT Filed: Oct. 19, 2007

(86) PCT No.: PCT/IB2007/054258
§ 371 (c)(1),
(2), (4) Date: Apr. 22, 2009

(87) PCT Pub. No.: WO2008/050269
PCT Pub. Date: May 2, 2008

(65) Prior Publication Data
US 2009/0232146 A1    Sep. 17, 2009

(30) Foreign Application Priority Data
Oct. 24, 2006    (EP) .................................... 06122871

(51) Int. Cl.
*H04L 12/801* (2013.01)
*G06F 9/44* (2006.01)
*H04L 12/861* (2013.01)

(52) U.S. Cl.
CPC ............ *H04L 47/10* (2013.01); *G06F 9/4436* (2013.01); *H04L 49/90* (2013.01); *H04L 49/9057* (2013.01); *H04L 49/9078* (2013.01)

(58) Field of Classification Search
None
See application file for complete search history.

(56) References Cited

U.S. PATENT DOCUMENTS

| | | | | |
|---|---|---|---|---|
| 3,787,818 A | * | 1/1974 | Arnold et al. | 710/46 |
| 5,596,572 A | * | 1/1997 | Wille-Fier et al. | 370/360 |
| 5,600,640 A | * | 2/1997 | Blair et al. | 370/360 |
| 6,252,881 B1 | * | 6/2001 | Samoylenko | 370/433 |

(Continued)

OTHER PUBLICATIONS

Caspi, Eylon, et al; "Stream Computations Organized for Reconfigurable Execution (SCORE): Introduction and Tutorial"; Conference on Field Programmable Logic and Applications, FPL'2000; August 28-30, 2000; XP002474934; http://brass.cs.berkeley.edu/documents/score_tutorial.html.

(Continued)

*Primary Examiner* — Chirag Shah
*Assistant Examiner* — Suk Jin Kang
(74) *Attorney, Agent, or Firm* — McAndrews, Held & Malloy, Ltd.

(57) ABSTRACT

A data processing system comprising a plurality of interconnected nodes, each node comprising a media processor and one or more ports, each port connected to a respective media processor. Each port is configured to be active or passive, an active port being arranged, upon receipt of data, to transfer the received data to its output, a passive input port being arranged, upon receipt of data, to retain the received data and to transmit the received data to its output when the received data reaches a specific size, and a passive output port being arranged to trigger the receipt of data when the data capacity of the output port reaches a specific size.

3 Claims, 4 Drawing Sheets

(56) References Cited

U.S. PATENT DOCUMENTS

| | | | |
|---|---|---|---|
| 7,203,731 B1* | 4/2007 | Coates et al. | 709/214 |
| 7,590,747 B2* | 9/2009 | Coates et al. | 709/229 |
| 7,701,424 B2* | 4/2010 | Karaki | 345/87 |
| 8,194,690 B1* | 6/2012 | Steele et al. | 370/412 |
| 2002/0078269 A1* | 6/2002 | Agarwala et al. | 710/22 |
| 2004/0090465 A1* | 5/2004 | Robertson et al. | 345/780 |
| 2005/0190697 A1* | 9/2005 | Dohi et al. | 370/235 |
| 2006/0028687 A1* | 2/2006 | Karaki | 358/3.01 |
| 2006/0265205 A1* | 11/2006 | Weiss et al. | 703/13 |
| 2007/0036166 A1* | 2/2007 | De Marchi et al. | 370/402 |
| 2007/0086428 A1* | 4/2007 | Lai et al. | 370/351 |

OTHER PUBLICATIONS

Sadasivam, M., et al; "Autonomous Buffer Controller Design for Concurrent Execution in Block Level Pipelined Dataflow"; VLSI 2004; Proceedings; IEEE Computer Society Annuanl Symposium on Lafayette, LA, US; Feb. 19-20, 2004; Lost Alamitos, CA; pp. 303-304; XP010726432; ISBN: 0-7695-2097-9.

No Author Cited; "Integration of a 'Dataflow Pipeline' With a 'Dataflow Graph' Programming Model" ip.Com Journa, ip.com, Inc., West Henrietta, NY, US; Nov. 5, 2004; XP0103022052; ISSN: 1533-0001.

* cited by examiner

SYSTEM COMPRISING NODES WITH ACTIVE AND PASSIVE PORTS

CROSS-REFERENCE TO RELATED APPLICATIONS

This is a 371 Application claiming benefit/priority of PCT/IB2007/054258, filed Oct. 19, 2007, and also claims the benefit/priority of EP priority application No. 06122821.4, filed Oct. 26, 2006.

BACKGROUND

This invention relates to a system comprising a plurality of nodes.

Streaming framework software for media-processing typically defines standard interfaces for control and data transfers to and from media processors such as codecs, or pre/post-processors. As a result, (software instances of) media processors of various kinds can be controlled and connected by the framework in a uniform way. This makes software or hardware media processors components re-usable in different applications with widely varying streaming network graph topologies, which may dynamically change while running an application. Media processors that for their processing rely on using hardware accelerators or separate CPU/DSP cores also benefit from standard interfaces, because these standard interfaces then apply to the driver code and possibly standard hardware channels.

A typical media processing network contains vertices each consisting of a filter node, and edges forming the stream-connections between the filter nodes. A filter node usually consists of a media processor and a generic framework component that controls the media processor. Usually the filter nodes are executed each within their own OS-task (POSIX: thread). This has the advantage to allow the filtering node's media processor to operate actively: it may fetch its input data and deposit its output data in quantities as dynamically determined by the media processor (codec). Also it may periodically check for commands that may have been queued by some controlling entity, without interference in critical media processing steps.

An important disadvantage of streaming frameworks that assign one OS-task to each filter node is the relatively large task-switching overhead when filter nodes process small quantities of data or when the cycle requirements of the media processor is low (typical for pre- or post-processor pipelines). To suppress this overhead, it is common to introduce an amount of data queuing between filter nodes which will allow for less frequent task switching, but this introduces two new problems: excessive latency in the stream (more data is accumulated than needed for processing steps), and increased memory requirements.

More advanced streaming frameworks avoid the above described efficiency problem by assigning an OS-task only to a few (or only one) of the filter nodes. These nodes are called "active" while the other nodes are "passive". A passive filter node has no own OS-task. Passive filter nodes are invoked and executed in the context of data production (push) or consumption (pull) of an adjacent filter node which is active, or which is passive and was itself called by another filter node. At least one active filter node must exist in such a streaming network.

However, these types of systems have further problems. For example, in an advanced streaming framework with passive filter nodes, the media processors need a different interface, depending on whether they are used in a passive, or in an active filter node. This means at least two versions of a media processor need to be written to provide its functionality at an arbitrary position in a streaming network.

Secondly, in the advanced streaming framework with passive filter nodes, the media processors in passive filter nodes are typically called with a producer-determined amount of input data (push), or a consumer determined amount of output space (pull). This may conflict with the needs of the media processor which may on the fly discover the amount of data needed/produced, depending on the contents of the stream.

It is therefore an object of the invention to improve upon the known art.

SUMMARY

The innovations herein are directed to systems and methods including nodes with active and passive ports.

In one exemplary implementation, there is provided a data processing system comprising a plurality of interconnected nodes, each node comprising a media processor and one or more ports, each port connected to a respective media processor. Further, each port may be configured to be active or passive, an active port being arranged, upon receipt of data, to transfer the received data to its output, a passive input port being arranged, upon receipt of data, to retain the received data and to transmit the received data to its output when the received data reaches a specific size, and a passive output port being arranged to trigger the receipt of data when the data capacity of the output port reaches a specific size.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF SEVERAL VIEWS OF THE DRAWINGS

Embodiments of the present invention will now be described, by way of example only, with reference to the accompanying drawings, in which.

DETAILED DESCRIPTION

Figure 1:
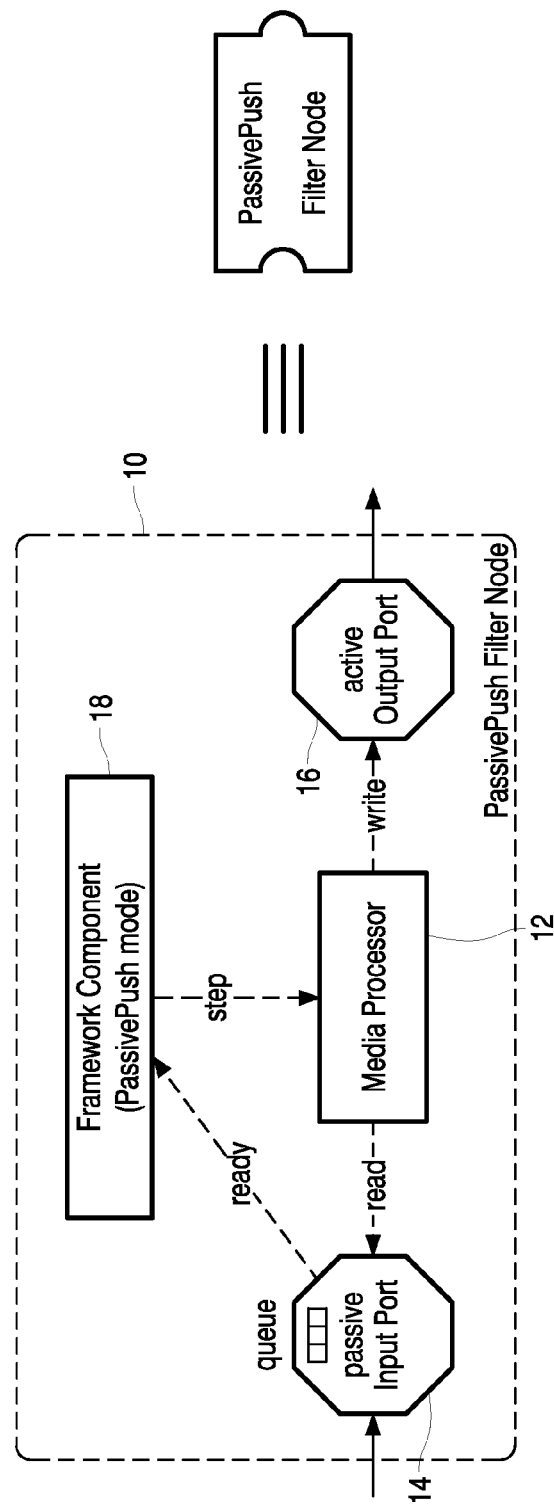
FIGS. 1, 2 and 3 are schematic diagrams of nodes for use in a data processing system.

According to the invention, there is provided a data processing system comprising a plurality of interconnected nodes, each node comprising a media processor, and one or more ports, each port connected to a respective media processor, wherein each port is configured to be active or passive, an active port being arranged, upon receipt of data, to transfer the received data to its output, a passive input port being arranged, upon receipt of data, to retain the received data and to transmit the received data to its output when the received data reaches a specific size, and a passive output port being arranged to trigger the receipt of data when the data capacity of the output port reaches a specific size.

Owing to the invention, it is possible to provide a system comprising nodes of media processors which can use standard interfaces to the media processors, but allows some nodes to be passive, by virtue of possessing one or more passive ports. Nevertheless data is not pushed onto the media processors in those nodes that are passive, allowing all media processors to decide how much data they wish to process.

There are three types of port in the system. An active port is arranged, upon receipt of data, to transfer the received data directly to its output. So an active input port receives data and transfers that data to the media processor to which it is connected. Likewise, an active output port will transfer its data to the input port to which it is connected.

The second type of port is a passive input port which, upon receipt of data, retains the received data and transmits the received data to its output when the received data reaches a specific size. In one embodiment, the passive input port will monitor the amount of data that it has received and when it has reached a specific size, the port either directly or indirectly triggers the media processor to call the passive input port for the data.

The third type of port is a passive output port which is arranged to trigger the receipt of data when the data capacity of the output port reaches a specific size. This port is effectively monitoring itself to check for the "emptiness" of the port to reach a certain level. When this happens, the output port triggers the media processor to which it is connected, to send data to the output port, which is then passed to the input port on the other side of the output.

The invention comprises a special software construction to allow media streaming networks to use less (down to only one) OS-tasks, while avoiding problems associated with common approaches to reduce OS-tasks. The invention provides a method to avoid task-switching overhead in streaming frameworks. The invention addresses both of the stated problems above, which are present in advanced streaming frameworks, by the following arrangements:

In the situation where data for consuming by a passive filter node is offered by calling to one of its ports, that port is a passive input port. Data calls to such a port are executed in the context of the OS-task belonging to an active filter node. When a passive input port is called with data, the media processor in the passive filter node is not called directly with this data. Instead, the data is stored in a queue associated with the port, until this queue is sufficiently filled. When the queue is sufficiently filled, its port is marked "ready". The size of this queue is much smaller than the queue size that would be needed to reduce task switching in a traditional streaming network.

Similarly, when data to be produced by a passive filter node is requested by calling to a connected port, that port is a passive output port. Data calls to such a port are executed in the context of an OS-task belonging to an active filter node. When a passive output port is called with empty space, the media processor is not called directly with the empty space. Instead, the data is obtained from a queue associated with the port, until this queue is sufficiently empty (see below). When the queue is sufficiently empty, its port is marked "ready". The size of this queue is much smaller than the queue size that would be needed to reduce task switching in a traditional streaming network.

If data for consuming by a passive filter node is fetched by one of its input ports by calling to a connected port of another filter node, the input port is an active input port. Such a port is connected a passive output port. Likewise, when data produced by a passive filter node is deposited by one of its output ports by calling to a connected port of another filter node, the output port is an active output port. Such a port is connected to a passive input port.

When all passive ports of a filter node belonging to one OS-task become ready, then the media processor is invoked to start processing, using the call that caused the last passive port to become ready. The media processor is called without data arguments: it will itself fetch the data it needs from its input ports, and it will itself deposit produced results to its output ports.

Being "sufficiently filled" or "sufficiently empty" of queues is dictated by characteristics of the media processor. The filling or emptying thresholds are calculated using static or dynamic media processor data. Implementations of the system protect against possible deadlock situations. For example, the streaming network, formed by active and passive filter nodes and connections between ports must not have cyclic chains of passive/active port connections belonging to the same OS-task.

The system provides that the media processors are not directly called with data as parameter(s), and they always call outward to fetch and deposit their data, which results in the software components for the media processing being constructed with identical interfaces for use with passive or active filter nodes. This solves the problem of requiring multiple different versions of the same media processor.

The media processor in a filter node is not aware of the difference between passive and active ports; it is not aware if it resides inside a passive, or an active filter node. When a media processor is executing, all its input/output queues that were dependent on the current OS-task to become ready have sufficient input data and sufficient empty space available. As a result the media processor can make a full media processing cycle without a need to return the current OS-task to the caller. Other queues of ports (belonging to OS-tasks different from the task currently executing the media processor) may not be ready, but they will be as the other OS-tasks make progress. Finally, the active ports of the media processor will be calling out to other filter nodes, to achieve progress getting or depositing streaming data from/to the queues of connected passive ports. This solves the problem of pushing data onto media processors in amounts that is not optimal for a specific processor.

FIG. 1 shows a first example of a node 10 that can be used in the data processing system. The node 10 comprises a media processor 12, and ports 14 and 16, each port connected to the respective media processor 12, and a framework component 18. In the system each port of a node 10 is configured to be either active or passive. An active port is arranged, upon receipt of data, to transfer the received data to its output, and a passive port is arranged, upon receipt of data, to retain the received data and to transfer the received data to its output upon a specific instruction. In FIG. 1, the node has a passive input port 14 and an active output port 16.

Each node of the software streaming framework (or system) consists of the following components: framework component, input port, output port, and a collection of media processors with uniform interface. A node of the system can operate in the one of the following modes: Active, PassivePush, PassivePull. The node 10 of FIG. 1 is a PassivePush node.

Figure 2:
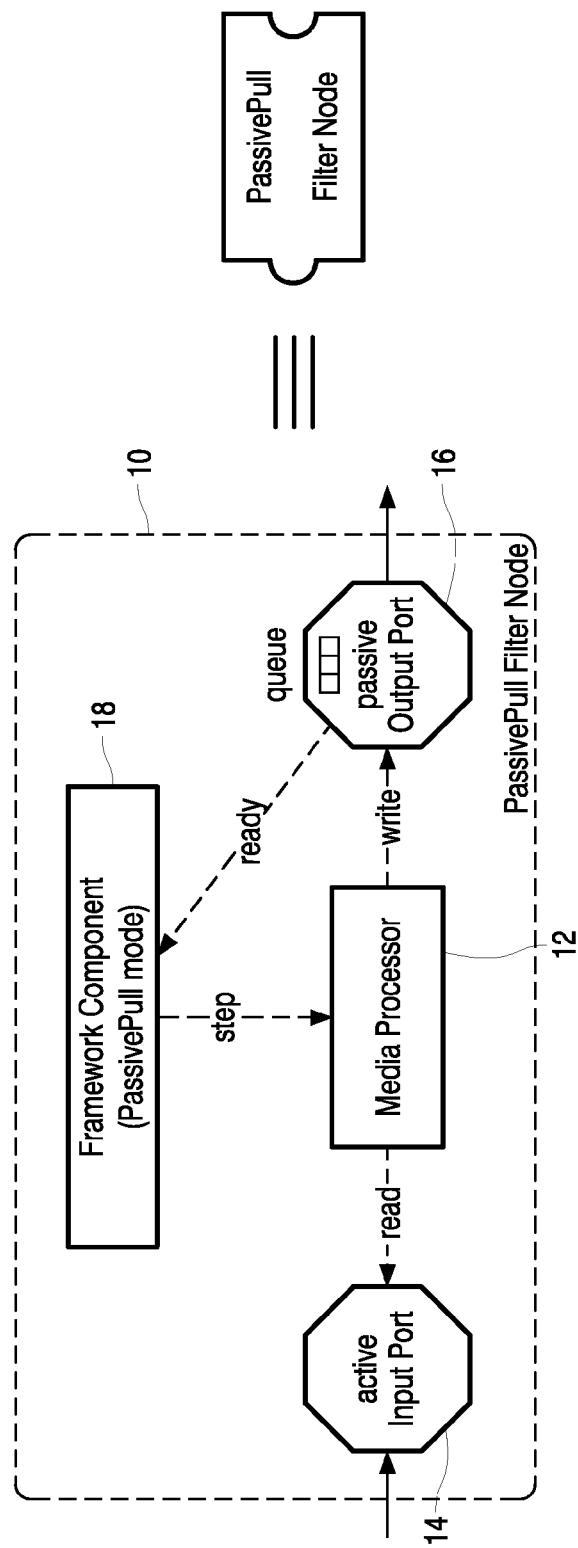

An input port 14 can operate in Passive, or Active mode. When it is Passive, as in the FIG. 1, the port 14 contains a queue of selectable capacity that can hold (references to) data packets. A passive input port 14 may call its framework component 18 to report its queue being ready. An output port 16 can likewise operate in Passive, or Active mode. When it is Passive, as in FIG. 2, the port 16 contains a queue of selectable capacity that can hold (references to) data packets. A passive output port 16 may call its framework component 18 to report its queue being ready.

Each filter node 10 of the system can be constructed from an arbitrary media processor 12, in combination with a framework component 18, zero or more input ports 14, and zero or more output ports 16. The system comprises a plurality of interconnected nodes 10.

Each media processor 12 has an interface containing a "step" function, called by the framework component 18, which starts a cycle of media processing. Furthermore, each media processor 12 may call input ports 14 to read filled data packets, and may call output ports 16 to deposit one or more data packets. Each media processor 12 is not aware if the ports 14 and 16 to which it is connected are active or passive.

Figure 3:
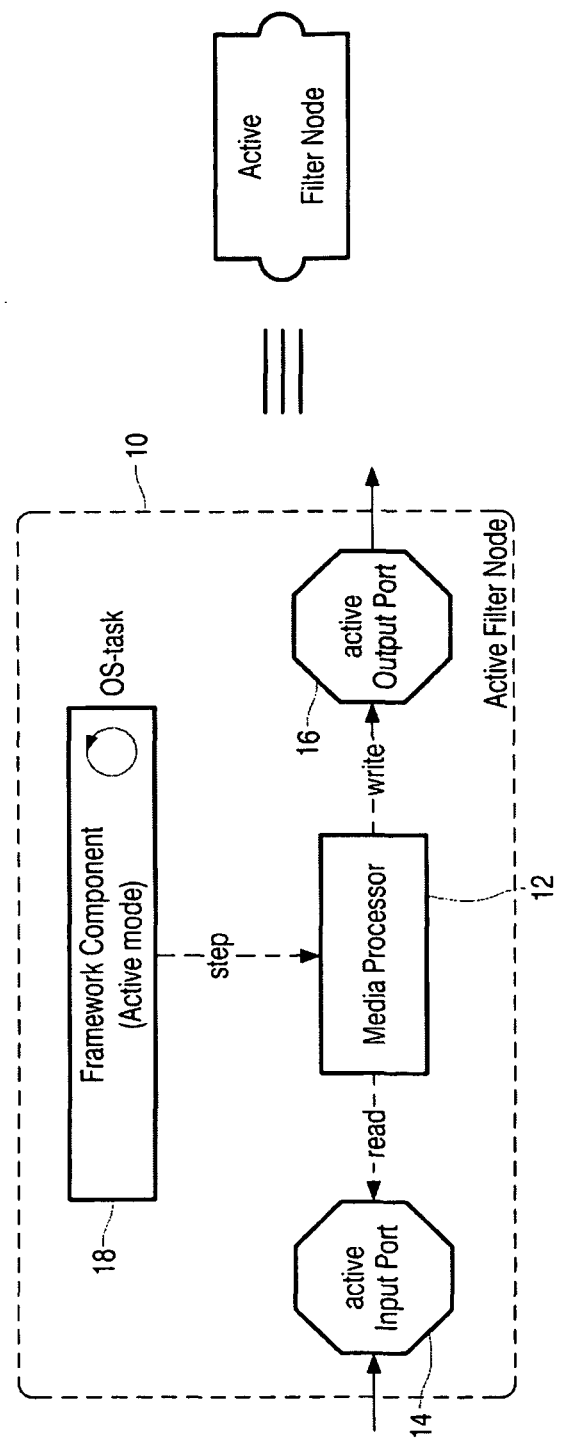

A filter node 10, such as that shown in FIG. 3, which is Active, has an Active input port 14 and an Active output port 16. A filter node 10, which is PassivePush (FIG. 1), has precisely one Passive port, which is the input port 14. All other input and output ports 14 and 16 are Active. A filter node 10 which is PassivePull (FIG. 2), has precisely one Passive port, which is the output port 16. All other output and input ports 14 and 16 are Active ports.

Arbitrary streaming networks, in the form of data processing systems may be constructed with a plurality of filter nodes 10, provided that, there is precisely one Active filter node 10 in the network, Passive inputs ports 14 are connected to Active output ports 16, Active inputs ports 14 are connected to Passive output ports 16 and there are no cyclic sequences of port connections in the streaming network.

Figure 4:
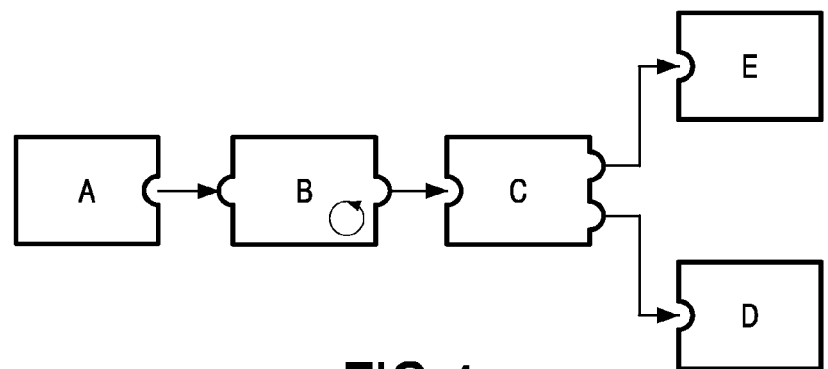
FIGS. 4 and 5 are schematic diagrams of examples of data processing systems.
Figure 5:
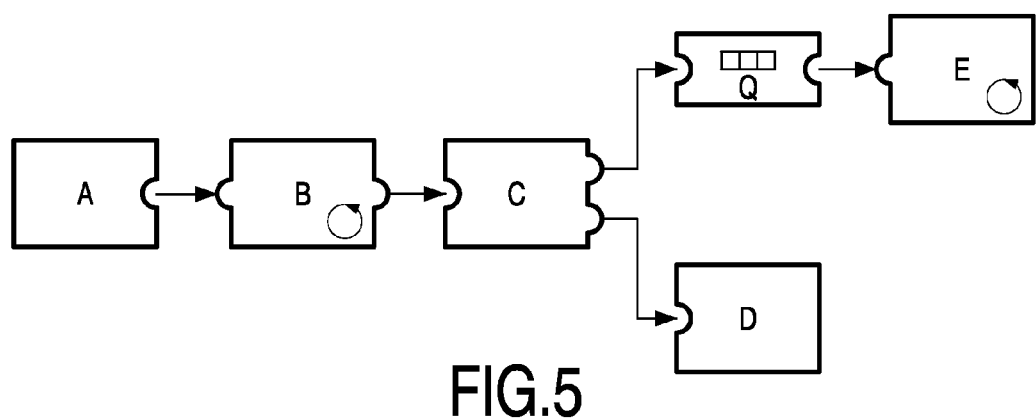

FIGS. 4 and 5 show examples of networks constructed from the various nodes 10.

In the example system of FIG. 4, the framework component 18 of the active filter node B will repetitively call the step function of its media processor 12, using its OS-task. As part of its step-execution, the media processor 12 fetches data via its (active) input port 14 as needed, and deposits data to its (active) output port 16 as needed.

When data is deposited in the input port 14 of node C, the call immediately returns if the queue of C is not ready (size is less than capacity). When data is deposited and the queue becomes filled (size=capacity) then the Ready function is called which calls the Step function of the PassivePush node C. The media processor 12 of node C will start processing in the same way as the media processor 12 in the active filter node B: it will fetch input data as needed by calling the input port 14 and produce output data as needed, calling its output ports 16. A specific instruction to read data is sent from the media processor 12 of node C to the input port 14 of the node C.

When data is fetched from the output port 16 of node A the call immediately returns (with a data packet) if the queue of output port 16 of node A is not ready (i.e. size is greater than zero). When data is requested and the queue of the output port 16 of node A is empty, then the Step function of the PassivePull node A is called. The media processor 12 of this filter node A will start processing in the same way as the media processor 12 in the Active and PassivePush filter node: fetching input data as needed (not in this particular example, because A has no inputs) by calling the input ports 14 and deposit output data as needed, by calling output ports 16. The execution of PassivePush filter nodes E and D follows the same pattern as that of C: from the point of view of nodes E, and D, node C acts like it is an Active filter node.

Additional interface calls on the components take care of conventional features such as configure, start, stop, pause, flush, disconnect, reconnect, notification etc. The details are not shown and are not relevant for the understanding of the invention.

A second embodiment of the data processing system is shown in FIG. 5. One or more streaming networks such as described in the embodiment of FIG. 4, are instantiated; each of them is called a task-domain. In FIG. 4, filter nodes A, B, C and D form a first task domain, and filter node E forms a second task domain. The second task domain consists of only one filter node E in this example, but may be a streaming network with many additional (PassivePush, PassivePull) filter nodes 10.

Each task-domain thus becomes a sub-network of a larger network. An active output port 16 of a task-domain is connected to an active input port 14 of another task-domain via a "separator_queue" component instance. In FIG. 5, the node Q is the separator_queue.

A separator_queue has one passive input port 14, and one passive output port 16. It provides queuing of packets, and the node Q delivers thread-safeness with respect to the OS-task belonging to the task-domain feeding the input port 14 of the node Q (the task domain of which B is the active component), and the OS-task belonging to the task-domain consuming the packets at the output port 16 of the node Q (the task-domain of which E is the active component).

The following additions to the embodiments discussed above are possible. The queues inside passive ports, and the separator_queues may be queues of bytes, or media samples instead of packets. Readiness of input/output ports will then become defined relative to an amount of bytes or samples respectively. The capacity of queues associated with passive ports may be adjusted dynamically. A typical case where this would be needed is where a media processor 12 switches to a different decoding algorithm, where the maximum expected quantities of input/output data per processing step are different. The restriction of only one passive port per filter node 10 is removed. Practical implementations need to pay proper attention to thread-safeness and synchronisation of filter nodes.

Applications of the system include multimedia streaming in embedded software in consumer electronics including mobile equipment, multimedia streaming in desktop computing software, such as media players, converters, capturing, instant messaging, editing software, and multimedia production and broadcasting systems.

What is claimed:

1. A streaming data processing system, comprising:
a plurality of interconnected hardware nodes for concurrently performing OS-tasks, each hardware node comprises:
a media processor;
an active port connected to the media processor and to a passive port of a first adjacent hardware node, the active port being configured to transfer received data upon receipt; and
a passive port that is connected to the media processor and to an active port of a second adjacent hardware node, the passive port being configured to retain received data and to transmit the received data when the received data reaches a specific size; and
wherein:
the hardware node operates in a particular mode from a plurality of modes comprising: Active mode, PassivePush mode, and PassivePull mode;
each of the media processor, the active port, and the passive port adaptively operates based on the particular mode;

when the particular mode is PassivePush mode, the passive port is an input port containing a queue of selectable capacity that can hold data packets and the active port is an output port; and when the particular mode is PassivePull mode, the passive port is an output port containing a queue of selectable capacity that can hold data packets and the active port is an input port.

2. The system of claim 1, wherein each hardware node further comprises a framework component arranged to step the media processor of the hardware node in which it is contained in response to a signal from the passive port.

3. The system of claim 1, wherein the passive port comprises a queue, the passive port being operative to mark the port ready to proceed with a data call when the received data in the queue has reached the specified size.

* * * * *